(12) United States Patent
Chen et al.

(10) Patent No.: US 9,880,839 B2
(45) Date of Patent: Jan. 30, 2018

(54) INSTRUCTION THAT PERFORMS A SCATTER WRITE

(71) Applicant: Intel Corporation, Santa Clara, CA (US)

(72) Inventors: Wei-Yu Chen, Santa Clara, CA (US); Guei-Yuan Lueh, San Jose, CA (US); Subramaniam Maiyuran, Gold River, CA (US); Supratim Pal, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 663 days.

(21) Appl. No.: 14/261,097

(22) Filed: Apr. 24, 2014

(65) Prior Publication Data
US 2015/0309800 A1  Oct. 29, 2015

(51) Int. Cl.
*G06F 9/30* (2006.01)

(52) U.S. Cl.
CPC ...... *G06F 9/30032* (2013.01); *G06F 9/30036* (2013.01); *G06F 9/30043* (2013.01)

(58) Field of Classification Search
None
See application file for complete search history.

(56) References Cited

U.S. PATENT DOCUMENTS

| | | | | |
|---|---|---|---|---|
| 5,651,121 A | * | 7/1997 | Davies | G06F 7/764 708/490 |
| 2012/0166761 A1 | * | 6/2012 | Hughes | G06F 9/30018 712/7 |
| 2014/0108769 A1 | * | 4/2014 | Jha | G06F 9/30036 712/205 |

OTHER PUBLICATIONS

Naik, Sumedh "Understanding Gather-Scatter Instructions and The-Gather-Scatter-Unroll Compiler Switch", Https://software.intel.com/en-us/articles/understanding-gather-scatter-unroll-compiler-switch, submitted Jan. 6, 2014, pp. 1-7.

* cited by examiner

*Primary Examiner* — John Lindlof
(74) *Attorney, Agent, or Firm* — Nicholson De Vos Webster & Elliott LLP

(57) ABSTRACT

A processor is described having an instruction execution pipeline. The instruction execution pipeline has an instruction fetch stage to fetch an instruction specifying multiple target resultant registers. The instruction execution pipeline has an instruction decode stage to decode the instruction. The instruction execution pipeline has a functional unit to prepare resultant content specific to each of the multiple target resultant registers. The instruction execution pipeline has a write-back stage to write back said resultant content specific to each of said multiple target resultant registers.

20 Claims, 14 Drawing Sheets

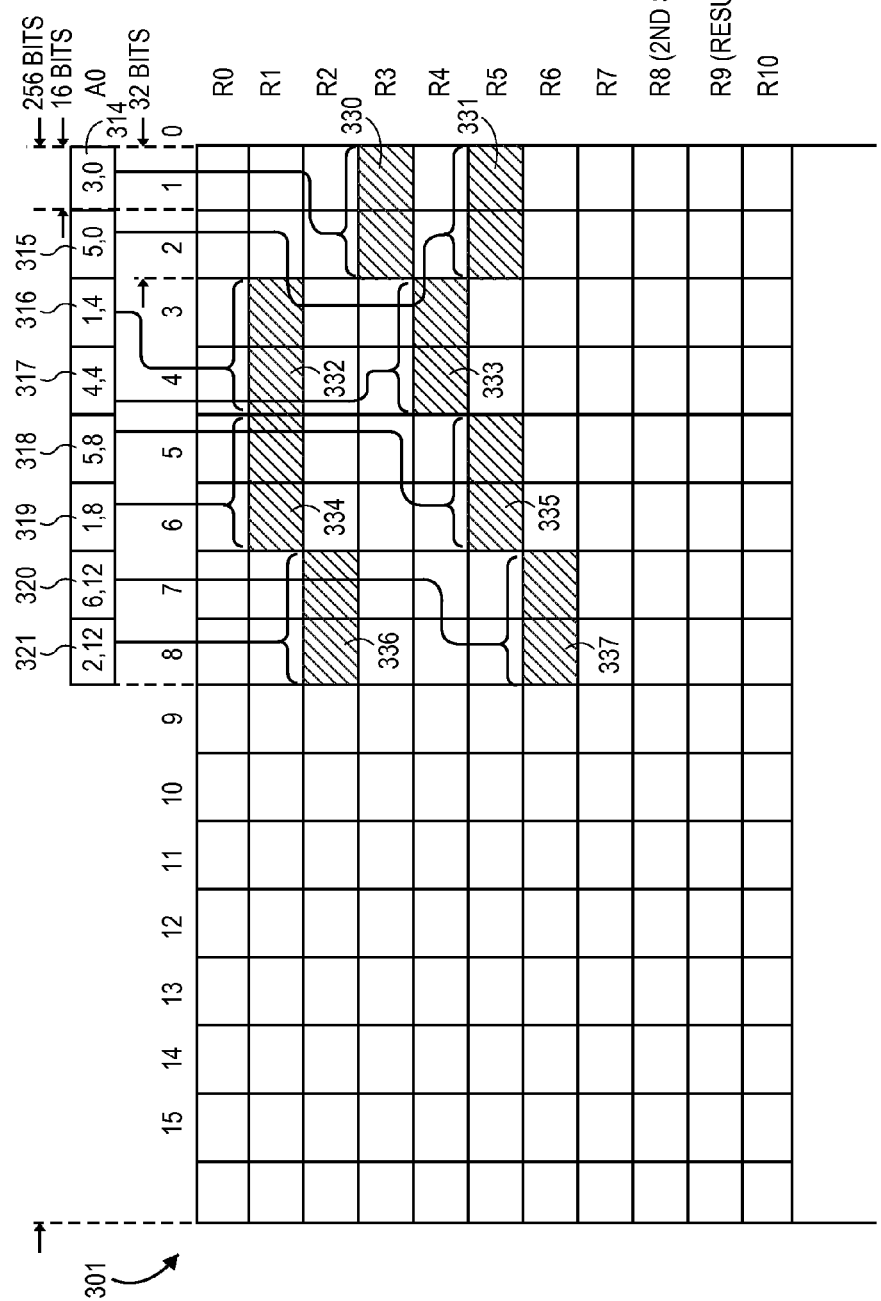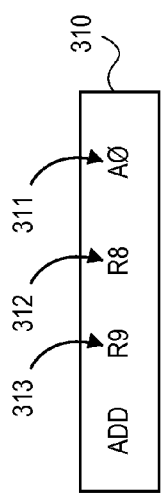
FIG. 3
(PRIOR ART)

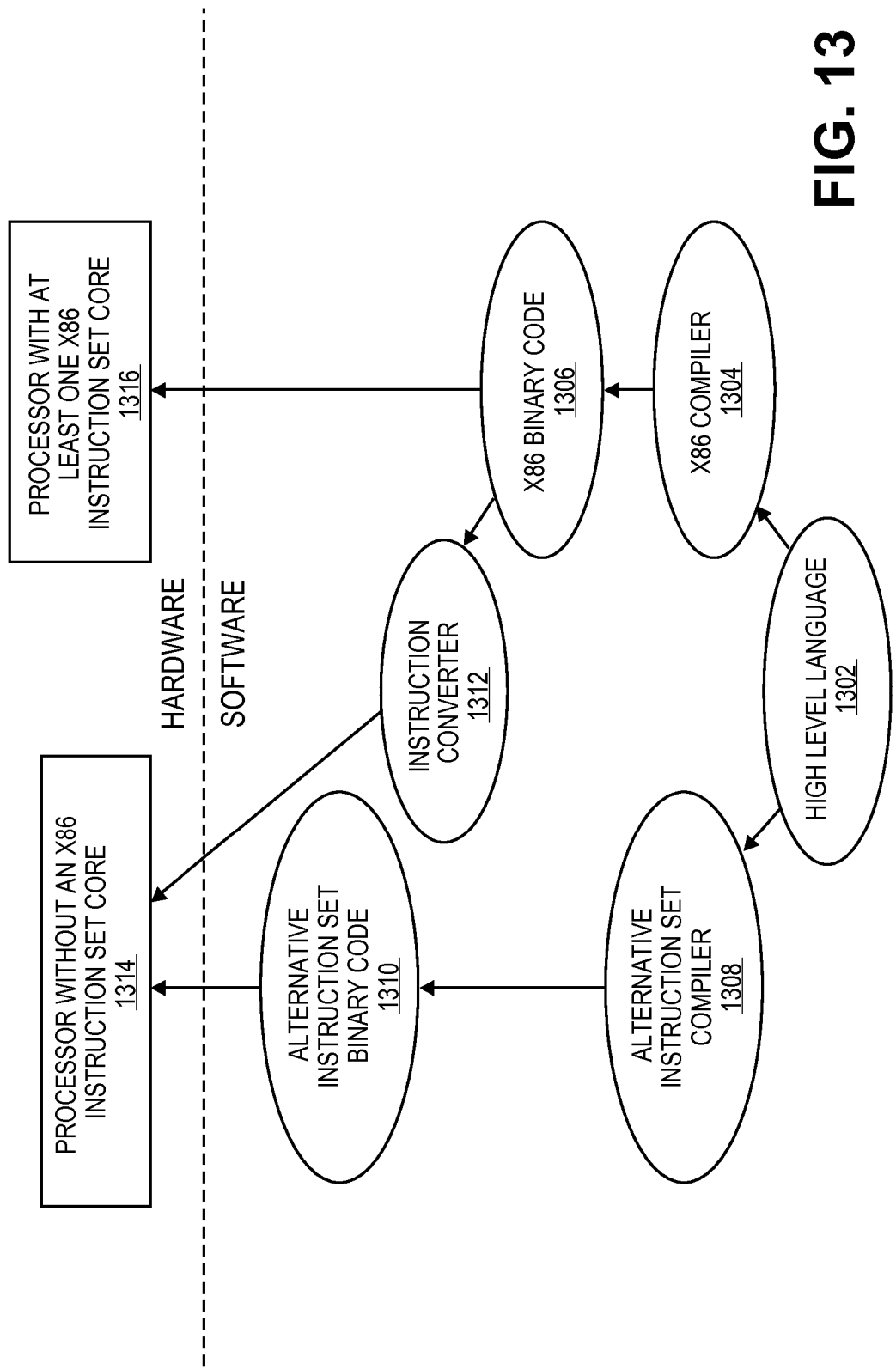

INSTRUCTION THAT PERFORMS A SCATTER WRITE

FIELD OF THE INVENTION

The field of invention pertains to an instruction that performs a scatter write.

BACKGROUND

FIG. 1 shows a high level diagram of a processing core 100 (e.g., general purpose processing core, graphics processing unit) implemented with logic circuitry on a semiconductor chip. The processing core includes a pipeline 101. The pipeline consists of multiple stages each designed to perform a specific step in the multi-step process needed to fully execute a program code instruction. These typically include at least: 1) instruction fetch and decode; 2) data fetch; 3) execution; 4) write-back. The execution stage performs a specific operation identified by an instruction that was fetched and decoded in prior stage(s) (e.g., in step 1) above) upon data identified by the same instruction and fetched in another prior stage (e.g., step 2) above). The data that is operated upon is typically fetched from (general purpose) register storage space 102. New data that is created at the completion of the operation is also typically "written back" to register storage space (e.g., at stage 4) above).

The logic circuitry associated with the execution stage is typically composed of multiple "execution units" or "functional units" 103_1 to 103_N that are each designed to perform its own unique subset of operations (e.g., a first functional unit performs integer math operations, a second functional unit performs floating point instructions, a third functional unit performs load/store operations from/to cache/memory, etc.). The collection of all operations performed by all the functional units corresponds to the "instruction set" supported by the processing core 100.

FIGURES

A better understanding of the present invention can be obtained from the following detailed description in conjunction with the following drawings, in which:

FIG. 3 shows a prior art gather method;

FIG. 13 illustrates a block diagram contrasting the use of a software instruction converter to convert binary instructions in a source instruction set to binary instructions in a target instruction set according to embodiments of the invention;

DETAILED DESCRIPTION

Figure 2A:
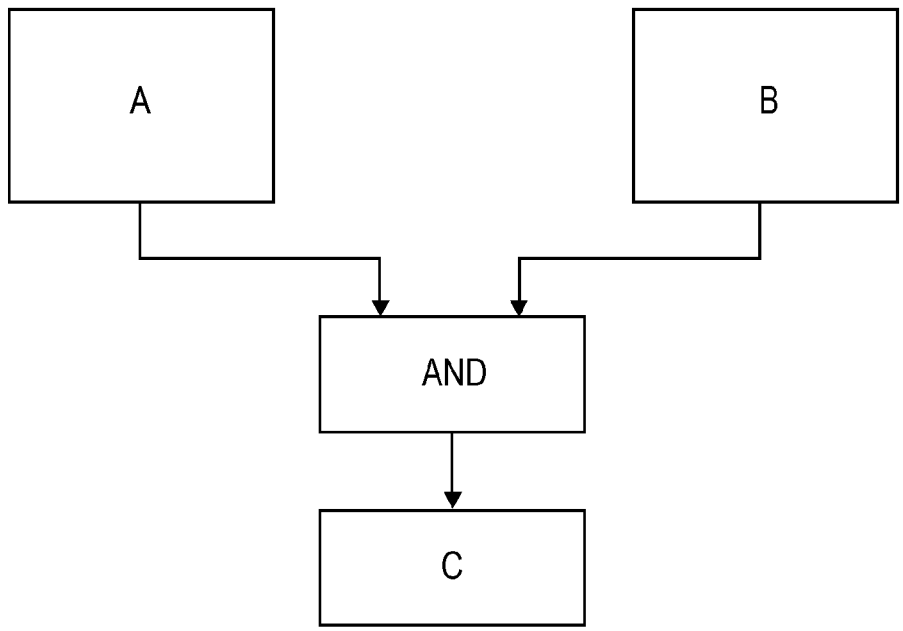
FIGS. 2a and 2b show processing diagrams.
Figure 2B:
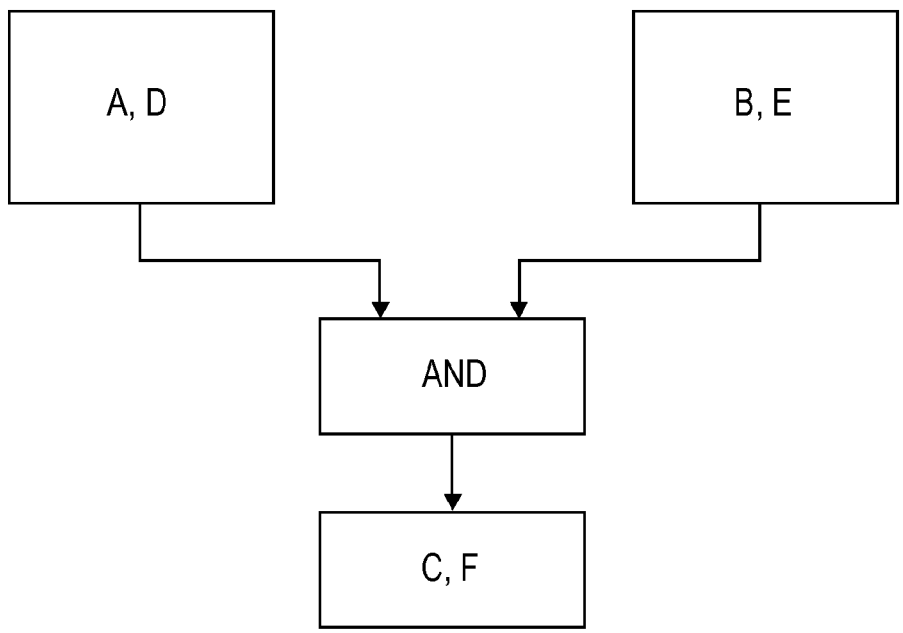

Two types of processor architectures are widely recognized in the field of computer science: "scalar" and "vector". A scalar processor is designed to execute instructions that perform operations on a single set of data, whereas, a vector processor is designed to execute instructions that perform operations on multiple sets of data. FIGS. 2A and 2B present a comparative example that demonstrates the basic difference between a scalar processor and a vector processor.

FIG. 2A shows an example of a scalar AND instruction in which a single operand set, A and B, are ANDed together to produce a singular (or "scalar") result C (i.e., AB=C). By contrast, FIG. 2B shows an example of a vector AND instruction in which two operand sets, A/B and D/E, are respectively ANDed together in parallel to simultaneously produce a vector result C, F (i.e., A.AND.B=C and D.AND.E=F). As a matter of terminology, a "vector" is a data element having multiple "elements". For example, a vector V=Q, R, S, T, U has five different elements: Q, R, S, T and U. The "size" of the exemplary vector V is five (because it has five elements).

Figure 1:
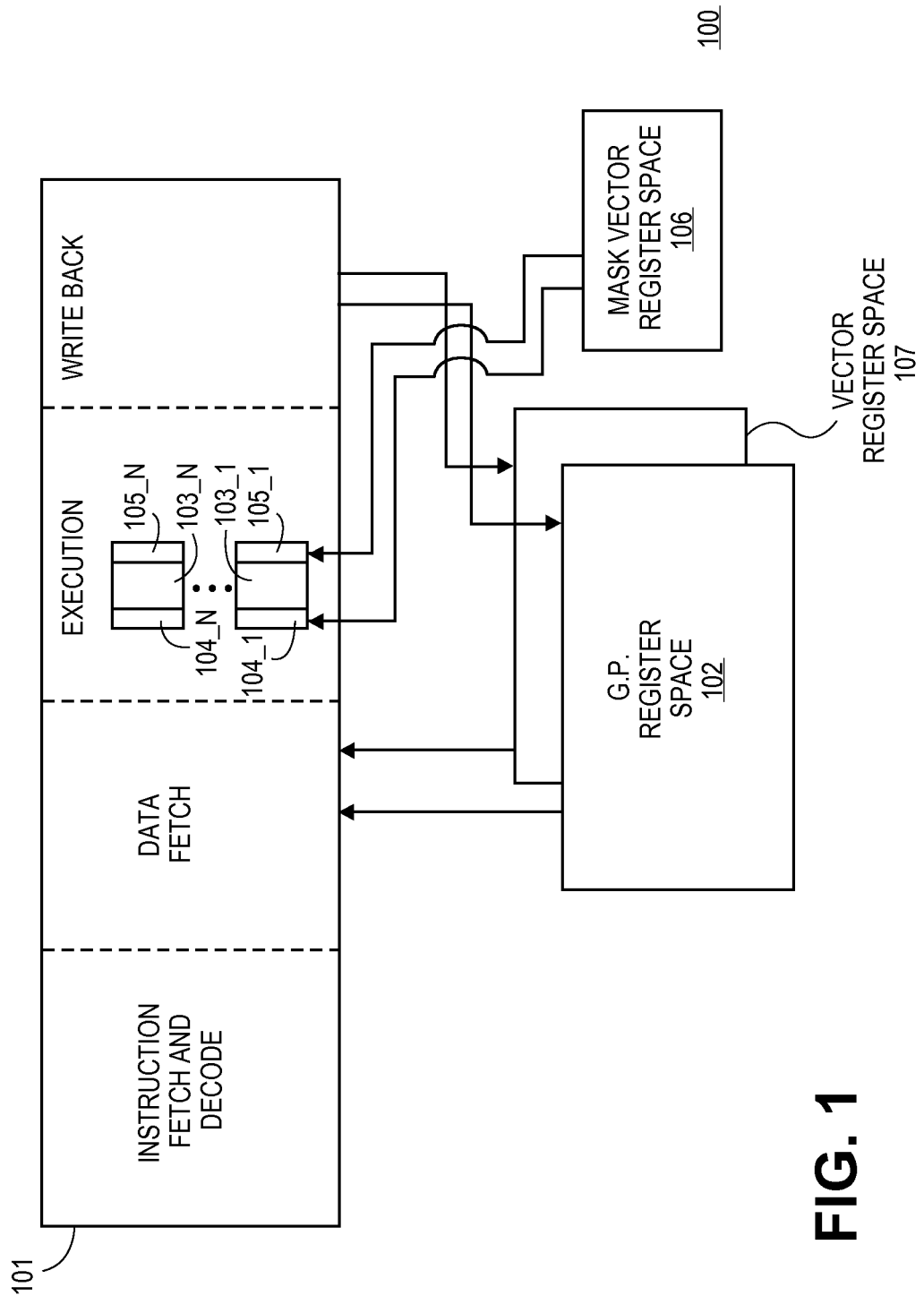
FIG. 1 shows a depiction of an instruction execution pipeline.

FIG. 1 also shows the presence of vector register space 104 that is different that general purpose register space 102. Specifically, general purpose register space 102 is nominally used to store scalar values. As such, when, the any of execution units perform scalar operations they nominally use operands called from (and write results back to) general purpose register storage space 102. By contrast, when any of the execution units perform vector operations they nominally use operands called from (and write results back to) vector register space 107. Different regions of memory may likewise be allocated for the storage of scalar values and vector values.

Note also the presence of masking logic 104_1 to 104_N and 105_1 to 105_N at the respective inputs to and outputs from the functional units 103_1 to 103_N. In various implementations, only one of these layers is actually implemented—although that is not a strict requirement. For any instruction that employs masking, input masking logic 104_1 to 104_N and/or output masking logic 105_1 to 105_N may be used to control which elements are effectively operated on for the vector instruction. Here, a mask vector is read from a mask register space 106 (e.g., along with input data vectors read from vector register storage space 107) and is presented to at least one of the masking logic 104, 105 layers.

Over the course of executing vector program code each vector instruction need not require a full data word. For example, the input vectors for some instructions may only be 8 elements, the input vectors for other instructions may be 16 elements, the input vectors for other instructions may be 32 elements, etc. Masking layers 104/105 are therefore used to identify a set of elements of a full vector data word that apply for a particular instruction so as to effect different vector sizes across instructions. Typically, for each vector instruction, a specific mask pattern kept in mask register space 106 is called out by the instruction, fetched from mask register space and provided to either or both of the mask layers 104/105 to "enable" the correct set of elements for the particular vector operation.

Vector architectures have been known to support register file "regioning" and the ability to read input operand information as a "gather" operation that collects different data elements from different vectors within the vector register file to effect a single logical vector input operand.

FIG. 3 shows an example. As observed in FIG. 3 the instruction format 310 of a vector ADD instruction specifies the "gathering" of data elements for a single "logical" vector source operand from multiple vector registers within a general purpose vector register file 301. The vector ADD instruction performs a vector ADD of the data elements within a first source vector operand specified by portion 311 of the instruction format 310 with the data elements within second source vector operand specified by portion 312 of the instruction format 310. The result of the vector ADD operation is stored in a resultant vector register specified by portion 313 of the instruction format 310.

As observed in the instruction format 310 of FIG. 3, resultant is stored in vector register R9 and the second source vector operand is stored in register R8. The first vector operand, however, is a "logical" construction of different data elements taken from vector registers R1 through R6. The definition as to which data elements are taken from which registers is specified in register A0. According to the GEN architecture of Intel Corporation of Santa Clara, Calif., vector registers of type "A" are special registers that are used to keep operands that specify gather operations. The architecture of the instruction execution pipeline therefor includes an "R" vector register file for keeping vector operands of general use and an "A" vector register file to keep operands that specify gather operations.

In the example of FIG. 3, the vectors of both register files are 256 bits wide and the instruction 310 contemplates "double-word" sized (32 bit) data elements for the vector ADD operation. The source and resultant operands therefore are constructed to include 8 data elements (32×8=256). The contents of register A0 are therefore understood to contain 8 data elements where each data element in A0 specifies the source for the same positioned data element in the "logical" first source operand of the instruction 310.

According to the example of FIG. 3, the first data element 314 in A0 includes the parameter "3,0" which is interpreted by the machine to mean the doubleword 330 whose origin is the first data byte of register R3. The second element 315 in A0 includes the parameter "5,0" which is interpreted by the machine to mean the doubleword 331 whose origin is the first data byte of register R5. The contents of the third and fourth elements 316, 317 of A0 likewise specify the doubleword 332, 333 whose origin is the fifth data byte of registers R1 and R4 respectively. The fifth and sixth data elements 318, 319 of A0 specify the doubleword 334, 335 whose origin is the ninth data byte of registers R1 and R5, respectively. The seventh and eighth data elements 320, 321 of A0 specify the doubleword 336, 337 whose origin is the twelfth data byte of registers R2 and R6, respectively.

As such, the "logical" source operand for the vector ADD instruction is understood to be composed of, in order, data elements 330 through 337.

Figure 4:
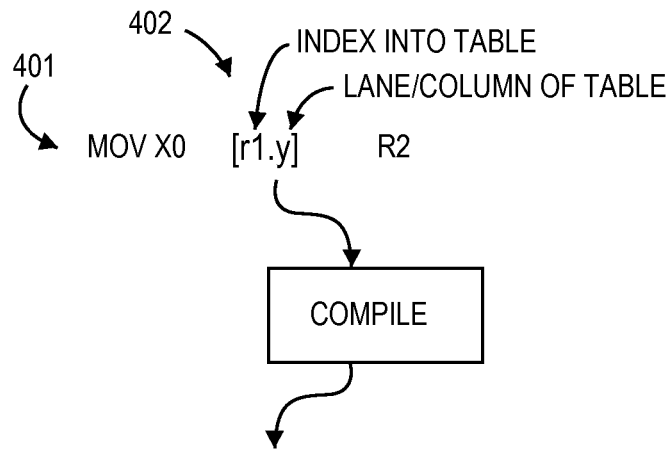
FIG. 4 shows a prior art object code footprint of an operation that desires to write to multiple registers.

A problem is that whereas gather operations have been implemented in hardware for source operands, a similar "scatter" capability that writes resultant elements across different registers in the register file has heretofore not been implemented in hardware. FIG. 4 demonstrates a particular inefficiency associated with the lack of ability to scatter resultants across multiple vector registers.

Present day compilers will construct higher-level code that contemplates a "scatter" write of different resultant elements across different registers within the vector register file. FIG. 4 shows an example of higher level (e.g., "assembly") code statement 401 that contemplates such a resultant. Here, the higher level assembly code statement 401 specifies a move operation ("MOV") in which the different elements of a single source vector in register R2 are moved into various elements of different registers within the general purpose vector register file as specified by the operand 402.

However, when the single higher level statement 401 is ultimately compiled down to machine level object code, the statement 401 expands into a series of instructions 410 a large component 411 of which individually write each data element of the vector resultant in a scalar fashion. Here, because the underlying hardware does not support "scatter" write of a resultant across elements of different vector registers, each data element in the resultant has to be individually written to its correct vector register and correct location therein with its own individual instruction.

Thus, even though the scatter write of resultant data elements is a concept that is understood at higher compilation levels, the underlying hardware cannot support such an operation which results, at the machine object code level, in large code footprint and slower performance (multiple instructions need to be executed to write each of the resultant vector elements).

Figure 5:
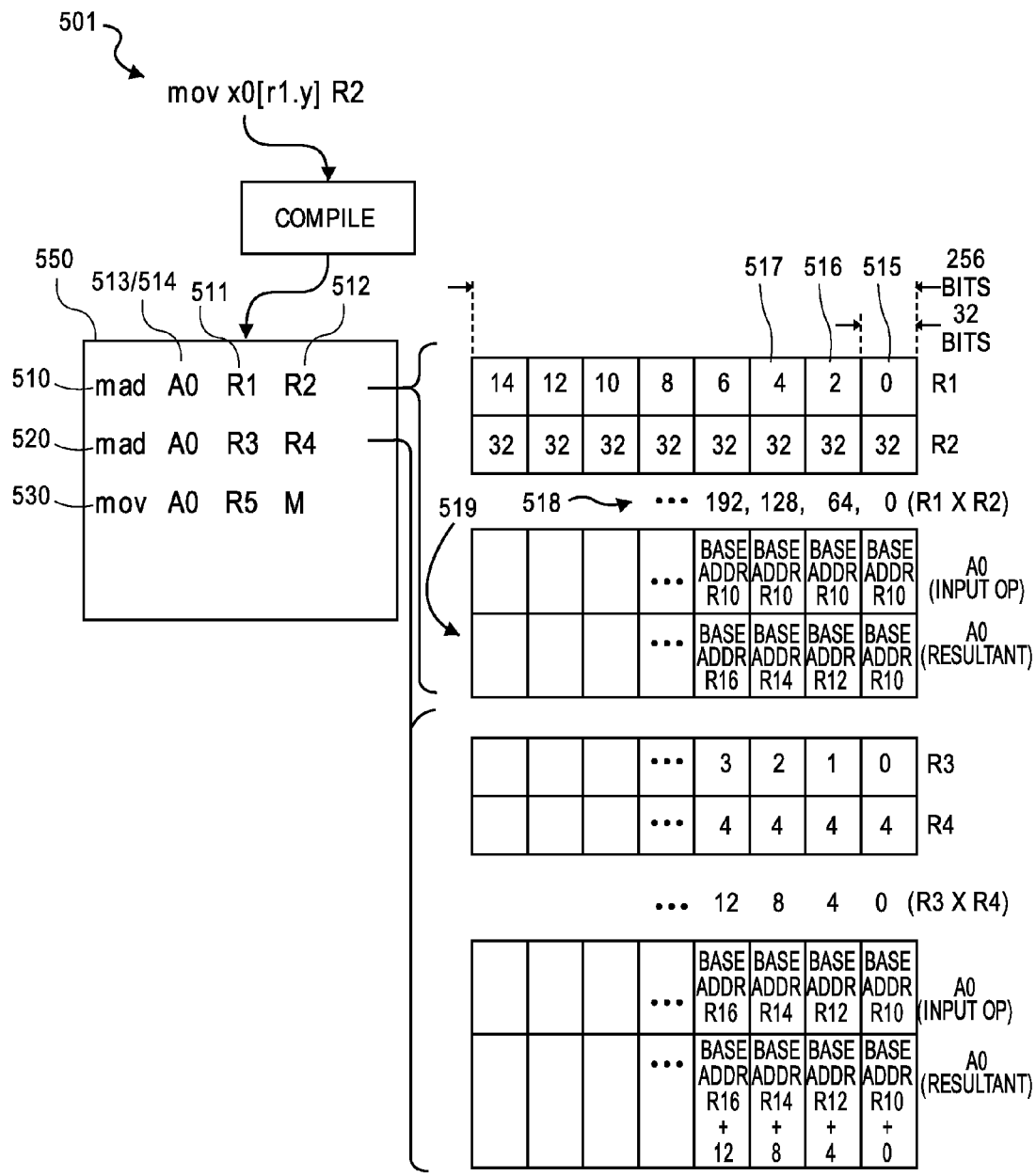
FIG. 5 shows an improved instruction sequence including an instruction that can perform a scatter write.

FIG. 5 shows an improved compilation environment in which the same higher level statement 501 is compiled down to a much smaller machine level object code footprint 550.

The first two instructions 510, 520 in FIG. 5 are vector multiply add ("mad") instructions that "setup" the definition in A0 for the scatter write of the resultant of the vector MOV instruction 530. Instructions 510 and 520 by themselves are not considered new (similar instruction sequences have been used to produce the "A" register file content that defines a scatter gather operation). However, with respect to MOV instruction 530, both the instruction format's definition of the resultant 531 and the underlying hardware's handling of the resultant are regarded as new because both are directed to a scatter write of the resultant into different vector registers via execution of a single instruction. Each of instructions 510, 520 and 530 are discussed in detail below for a complete understanding of the code sequence.

The first instruction 510 is a vector multiply-add instruction that: 1) performs a vector multiply on first and second vector source operands; and, 2) performs a vector add on the respective products of the vector multiply operation with a third source vector operand. Here, portions 511, 512 and 513 of the instruction format of instruction 510 correspond to the first, second and third vector source operands described above while portion 514 of the instruction format of instruction 510 corresponds to the resultant of instruction 510.

Portion 511 defines the contents of register R1 as corresponding to the first source operand. Here, the contents of R1 articulate the relative offset of the registers in the "register region" that the MOV instruction 530 will ultimately write to. The structure of R1 preserves the "lane" structure of the scatter write operation to be performed by instruction 530. More specifically, the first element 515 of R1 specifies that the first element/lane of the scatter write operation will write to the register regarded as the "origin" (specified with a value of "0") of the register region to be written to. The second element 516 of R1 specifies that the second element/lane of the scatter write operation will write to a register that is two register locations away from the origin register, the third element 517 of R1 specifies that the third element/lane of the scatter write operation will write to a register that is four register locations away from the origin register, etc. These values are particular to the specific example of FIG. 5. Other relative positions of the registers to be written can be specified with a different set of values in R1.

The contents of R2 articulate the number of bytes per register in each of the registers targeted by the scatter write operation of the MOV instruction 530. In the case of the exemplary machine being considered, each of the target registers are 256 bit vector registers. As such, each of the targeted registers has 32 bytes (256/8=32). The structure of R2 preserves the lane structure of the scatter write operation. Thus the first element of R2 indicates that the first element of the scatter write will be written in a register of 32 bytes, the second element of R2 indicates that the second element of the scatter write will be written in a register of 32 bytes, etc.

The vector multiplication of R1 and R2 518 therefore specify the offset in bytes of each of the registers targeted by the scatter write operation performed by MOV instruction 530. That is, the first element of the vector multiplication 518 result will be 0 which indicates that the first element of the scatter write performed by the MOV instruction 530 is the origin of the register region that the scatter write writes to, the second element of the vector multiplication 518 will be 64 which specifies that the second element of the scatter write performed by the MOV instruction 530 will be written to a register the "second from next" register from the origin (for example, if the origin is register R10, the second element will be written in register R12), etc.

The addend in A0 that is added to the vector multiplication of the contents of R1 and R2 to form the resultant 519 of instruction 510 specifies the base address of the register that is to be the origin of the register region that scatter write performed by MOV instruction 530 will write to. The base address is replicated across each element in the A0 input operand because the resultant of the multiplication of R1 and R2 already specifies the offset from the base address for each register targeted by the scatter write.

As such, if the base address is R10, the first element in the resultant 519 of instruction 510 will specify the base address of R10, the second element in the resultant 519 of instruction 510 will specify the base address of R12, etc. The instruction format of instruction 510 indicates that the resultant of instruction 510 is also stored in A0 (the same register that held the addend input operand). Other embodiments may choose not to have overlapping input and resultant register space. Note that A register space is used for the resultant because it will be used to specify the scatter write locations for the MOV instruction 530.

Recalling that each element in the contents of A0 in the example of FIG. 3 specified both a register and a byte location for each element of a scatter operation, the resultant of instruction 510 essentially specifies the register component for a similarly structured operand.

Instruction 520 is also a multiply add instruction. As will be described immediately below, the resultant of instruction 520 specifies both the register and the location for each lane of the scatter write result of the MOV instruction 530. As observed in FIG. 5, the first input operand in R3 specifies the doubleword location for each lane of the scatter write result. For example, the first lane of the scatter write will be written to the first doubleword (location "0") of its corresponding target register, the second lane of the scatter write will be written to the second doubleword (location "1") of its corresponding target register, etc. Because there are only eight doublewords in a 256 bit register, in the example of FIG. 5, the elements of R3 can only take on values from 0 to 7. A second input operand, located in R4, includes the value of "4" in each element to articulate that each doubleword written by the scatter write is composed of four bytes.

The result of the vector multiplication of R3 and R4 articulates the doubleword location of each resultant in the scatter write operand as a byte offset. This result is then added to the resultant of instruction 510 (in A0 which provides the base offset of each register for each lane in the scatter write) which, in turn, provides the complete address for each resultant of the scatter write to be performed by instruction 530. That is, a register address and a corresponding byte offset location within the register at that address is specified for each lane of the scatter write. This resultant is again kept in A0.

The MOV instruction 530 is then executed. Noticeably the MOV instruction 530 specifies a source operand R5 whose 8 doubleword elements are to be moved into the register locations specified by the contents of A0. The MOV instruction also includes a mask input operand (M) so that the content of only specific lanes in the source operand or the destination operand (depending on implementation) are involved in the move operation. Note that some difference (not depicted in FIG. 5) should exist between the instruction format of instruction 530 and instruction format of instructions 510, 520 to inform the hardware that the A0 operand of instruction 530 defines a scatter write operation while the A0 operand of instructions 510, 520 is treated as a standard input/resultant register.

Figure 6:
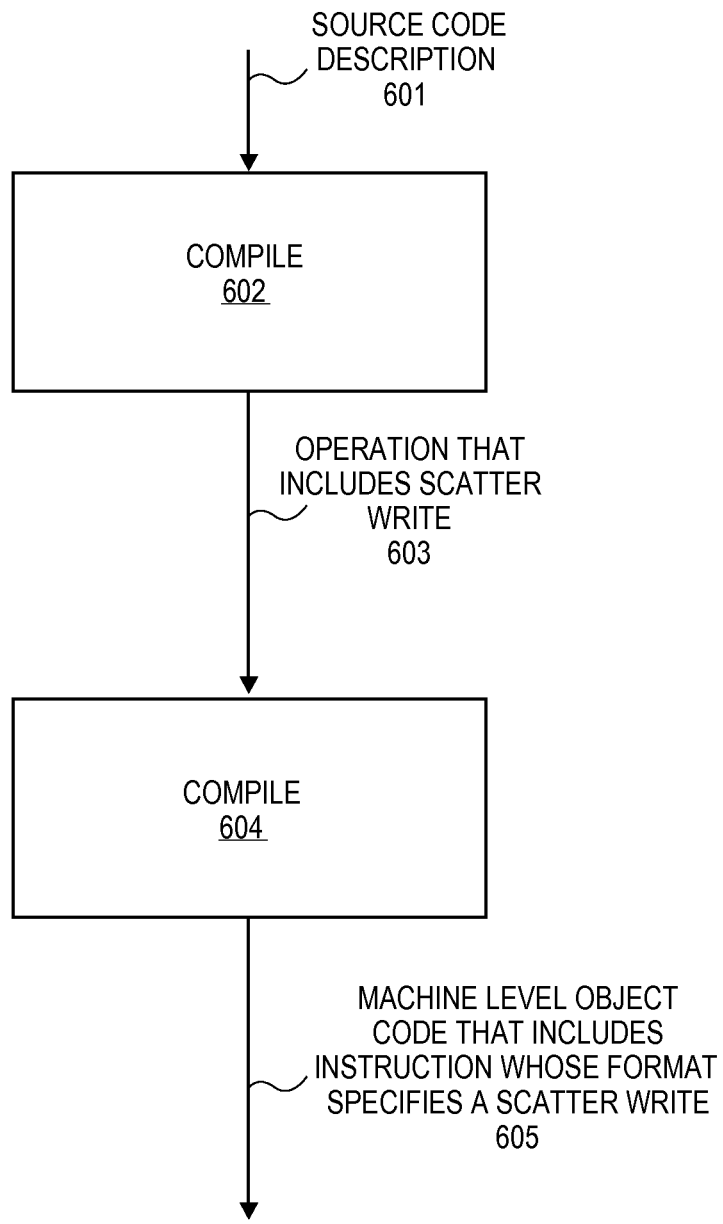
FIG. 6 shows a compilation methodology that produces an instruction that specifies a scatter write operation.

FIG. 6 shows a program code compilation process. As observed in FIG. 6, a source code level description 601 of a software program is compiled 602 (e.g., potentially through a number of different levels) to a level at which an operation that specifies a scatter write operation is articulated 603. The operation that specifies a scatter write operation 603 is then compiled 604 to machine level object code that includes an instruction whose instruction format includes a scatter written resultant 605. The compilation 604 that produces the instruction 605 may also create machine level object code that precedes the instruction 605 within one or more instructions that establish the input operand of the instruction 605 that specifies which registers and register locations are to be written to by the scatter write operation (e.g., akin to instructions 510 and 520 in FIG. 5).

Figure 7A:
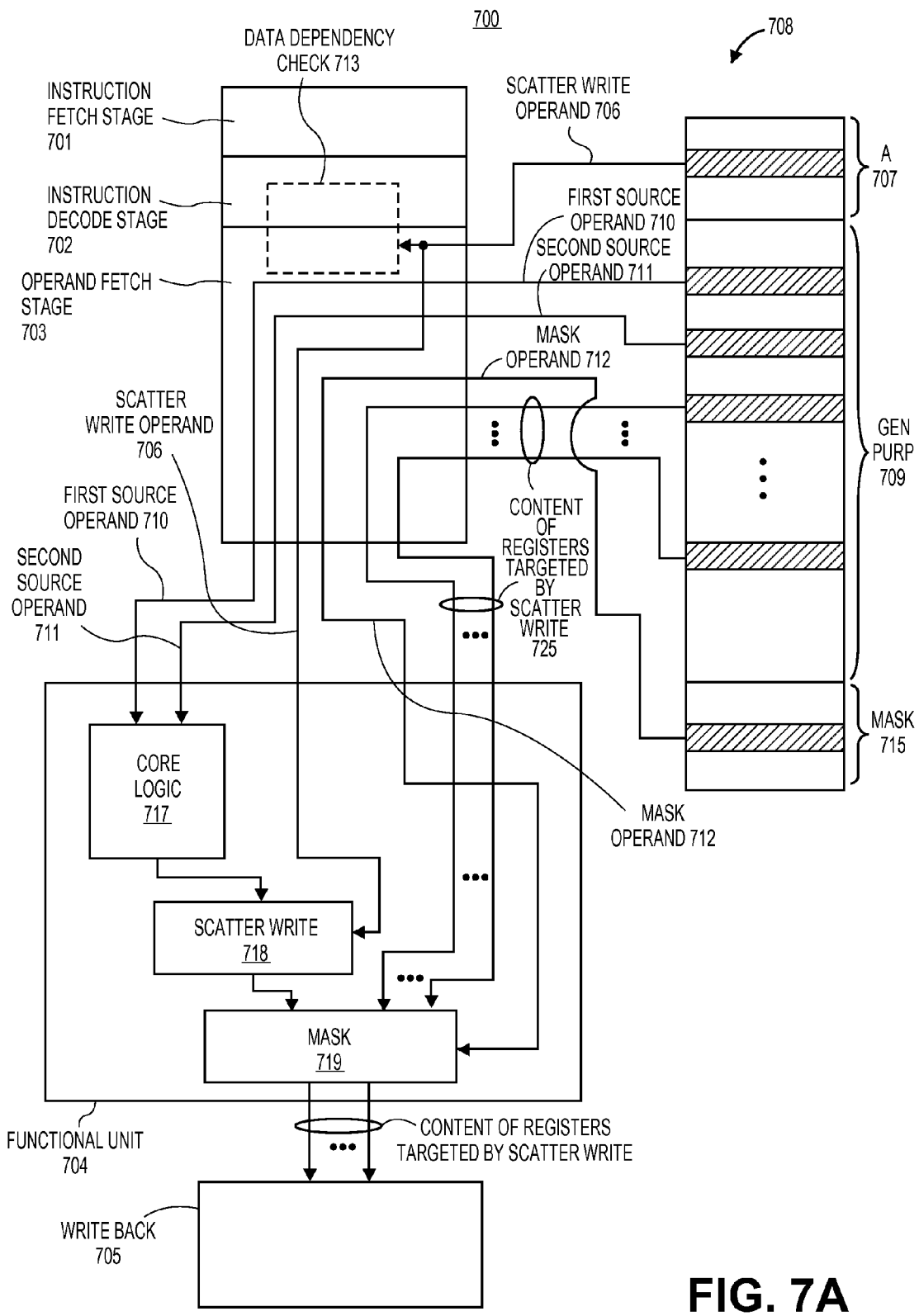
FIG. 7a shows a first embodiment of an instruction execution pipeline having a functional unit capable of performing a scatter write operation.

FIG. 7a shows a design for an instruction execution pipeline 700 that includes a functional unit 704 that is able to perform a scatter write operation. Each of the blocks illustrated in FIG. 7a may be implemented, for example, with logic circuitry disposed on a semiconductor chip.

As observed in FIG. 7a, the instruction execution pipeline 700 includes an instruction fetch stage 701, an instruction decode stage 702, an operand fetch stage 703, a functional unit 704 and a write back stage 705. As described in the background, the instruction fetch stage 701 fetches instructions, the decode stage decodes instructions and the operand fetch stage fetches operands.

In the case of instructions that perform a scatter write instruction, in the particular embodiment of FIG. 7a, the operand fetch stage will fetch a scatter write vector operand 706 from a first region 707 of register space 708 (e.g., A register space) whose content specifies the registers and the corresponding locations within these registers where the resultant elements are to be written by the scatter write operation. First source and optionally second source input operands 710, 711 are also fetched from other (e.g., general purpose vector) register space 709. A mask vector operand 712 may also be fetched from mask register space 715.

As is known in the art, the instruction decode and/or instruction fetch stages often include data dependency checking logic 713 to make sure the state of the pipeline is ready to begin execution of a next instruction from a data validity perspective. That is, operands for a next instruction are not fetched from register space 708 until it is known that all operations that precede the instruction in program order that could affect their respective values have completed, and, a next instruction is not formally issued to the functional unit that will execute it until it is known that the next instruction's resultant will not overwrite a value in register space that another instruction still depends upon as a valid input operand.

In the case of a scatter write operation, the later consideration is a potential issue. With traditional instructions only a single resultant register needed to be checked for data dependencies prior to issuance of an instruction that will write to it. With scatter write capability, however, the resultant data dependency check may need to be performed multi-fold as every register targeted by the scatter write operation should be checked to confirm that no instructions are dependent on their data by the time the scatter write instruction writes over them. As such FIG. 7a shows that the scatter write operand 706, which identifies the registers that will be written to by the scatter write, are provided to the data dependency checking logic 713 so the checking logic 713 can confirm that none of these registers will be overwritten by the scatter write operation until all operations that need their values as input operands have at least fetched these values.

According to one extreme approach, all the destination registers of the scatter write are cleared for data dependencies before the functional unit 704 begins execution of the instruction.

According to another potentially higher throughput approach, opcodes, micro-ops and/or other types of commands are issued or otherwise enacted in a more piecemeal fashion so as to permit the functional unit 704 to at least begin operation on the lanes for those registers targeted by the scatter write that have been cleared by the data-dependency logic 713 (and potentially before other registers targeted by the scatter write have not yet been cleared by the data-dependency logic 713).

For example, the data dependency logic 713 may accept the scatter write operand 706, identify which registers are to be written to by the scatter write operation and then begin checking data dependencies on these registers. Once any of these registers "clears" its data-dependencies, the functional unit 704 is issued micro-ops, an opcode or other command that permits the functional unit 704 to operate on at least those lanes that write to the register that was just cleared (and assuming the other input operands have cleared their associated data dependences and have or can be issued to the functional unit). The process continues until all registers targeted by the scatter write are written to.

As observed in FIG. 7a, the functional unit 716 includes respective inputs to receive the first operand 706, the first and optionally second source input operands 710, 711, the mask operand 712 and the content of the registers to be written to by the scatter write operation 725.

Here, as discussed above, the first operand 706 articulates the scatter write pattern. The first and optionally second source operands 710, 711 include the source operands that are operated on according to the logical operation of the instruction. With respect to the first and second source operands 710, 711 some embodiments may be designed to include only the first source operand 710, other embodiments may be designed to always include both the first and second source operands 710, 711, while yet other embodiments may be designed to include the first source operand 710 yet permit optional use of the second source operand 711. In the case of the MOV instruction 530 of FIG. 5 only one source operand was utilized.

The first and second source operand(s) 710, 711 feed into a core logic unit 717 that performs the core logic operation of the instruction. In the exemplary embodiment of FIG. 5, the core logic of the MOV instruction 530 is a move operation that moves ("copies over") register content from the source operand. Other possible core logic operations may include, to name just a few, the vector addition of first and second operands (VADD), the vector logical AND operation of the first and second operands (VAND), the vector comparison of the first and second operands (VCMP), the vector multiply of first and second operands (VMUL), the vector logical OR operation of the first and second operands (VOR), the exclusive OR operation of the first and second operands (VXOR), a decrement by 1 of each element in the first source operand (VDEC), an increment by 1 of each element in the first source operand (VINC), a logical NOT of each element in the first source operand (VNOT), etc.

At least in implementations where the functional unit 704 does not begin to execute the instruction until all registers targeted by the scatter write have cleared their data dependencies, the core logic unit 717 may operate on the source input operand(s) entirely in parallel, entirely serially (operation on one vector element position at a time with repetition of the operation across each of the vector elements in succession) or some combination of the two (e.g., operating on two vector element positions at a time with repetition of the operation across the remaining pairs of the vector elements in succession).

Beneath the core logic unit 717 is the scatter write logic 718 and masking logic 719. The scatter write logic 718 is responsible for implementing the scatter write operation in conjunction with the write back stage 720 of the pipeline.

As observed in FIG. 7a, the scatter write logic 718 accepts the scatter write input operand 706 and the output resultants from the core logic unit 717 as input parameters. From these input values the scatter write logic 718 provides content for all lanes that are targeted to a same destination register and provides them to the mask logic 719. The scatter write logic 718 may include, for example, scanning logic or other logic that scans the scatter write operand 706 for resultant elements that are targeted to a same resultant register. In cases where more than one resultant element from the core logic 718 is targeted to a same resultant register, these resultants are provided together to the mask logic for incorporation into the same resultant register content. The resultants are aligned with their proper resultant lane or otherwise provided with information that informs the mask layer which lane each resultant belongs to. Again, the scatter write logic performs this sequence of operations once for each register targeted by the scatter write.

The mask logic, as depicted in FIG. 7a, accepts the current content of the destination register to be written to and, for each lane/element having content from the scatter write logic 718 for this destination register, provides such content into the correct resultant lane/element if the mask vector input operand 712 permits it. In an embodiment, the mask vector 712 has an element for each lane in the register to be written to and indicates for each lane, if a value for it has been provided for it by the scatter write logic, whether or not that value is to be inserted into the resultant. Otherwise any element in the destination register's content remains unchanged. The output from the mask logic 719 is then provided to the write back stage 705 which writes the content into the destination register. This process is repeated for each destination register specified by the scatter write vector 706. In an embodiment there is one mask register used for all destination registers. Alternate embodiments may be designed to call in a unique/different mask register for each resultant register targeted by the scatter write.

To reiterate, regardless if the scheduling of operations is controlled within the functional unit 704 or above it, the functional unit 704 individually (e.g., serially) prepares the content for each register to be written to by the scatter write. If a single targeted register is to contain more than one of the resultant elements produced by the core logic 717, these elements are included together in the content for the single targeted register.

In an alternate implementation the mask logic 719 does not actually receive the content of the destination registers. Instead the write back stage 720 receives all "non masked out" resultant elements targeted to a same destination register (together with some identifier of the targeted destination register) and writes these values with vector element granularity (e.g., doubleword granularity) into the vector register space at the correct destination register location.

Figure 7B:
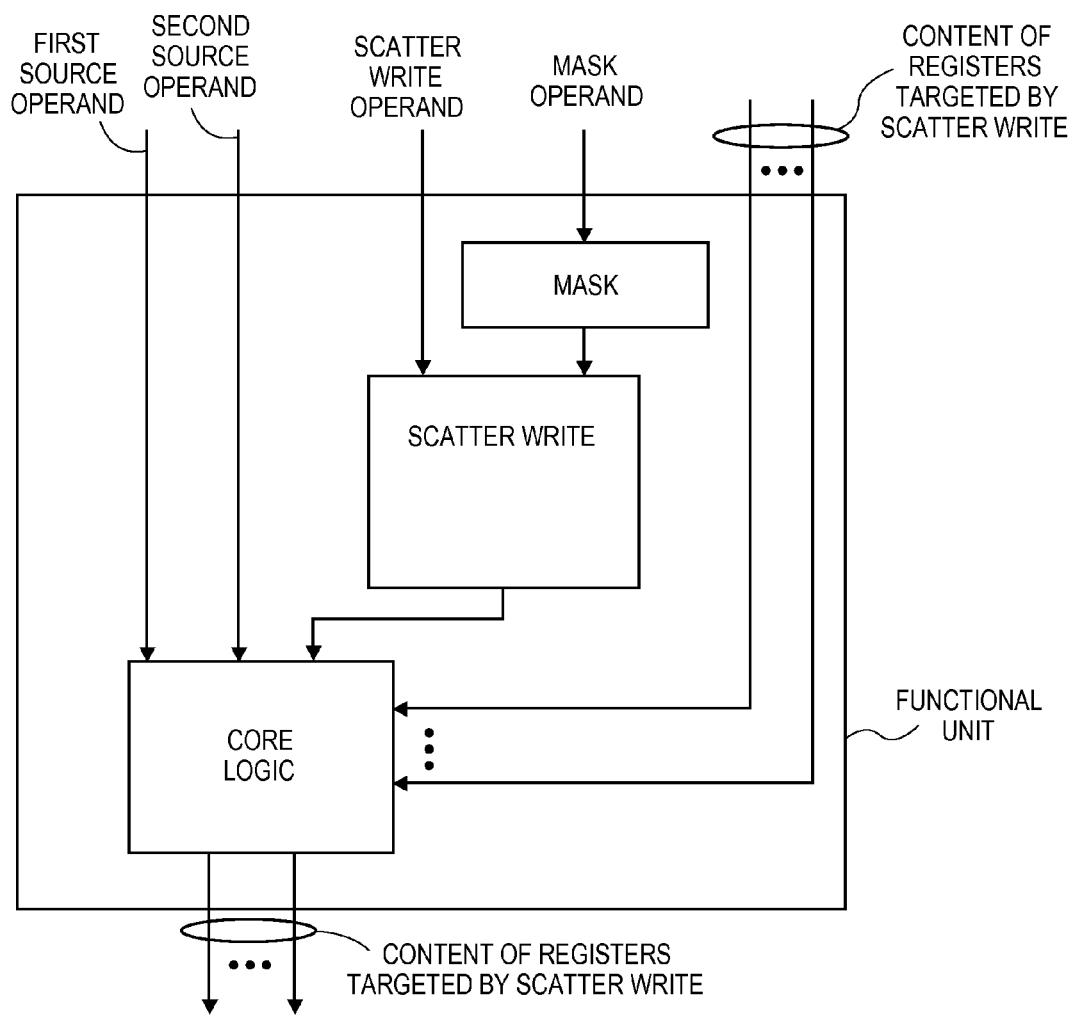
FIG. 7b shows a second embodiment of an instruction execution pipeline having a functional unit capable of performing a scatter write operation.

FIG. 7b shows another functional unit embodiment having a reversed datapath approach as compared to the approach of FIG. 7a. That is, as observed in FIG. 7b, initially a masking layer 729 determines, based on the mask input operand 722 which lanes of the resultant are to be actually processed. This information is provided to the scatter write logic 728 which identifies which of these lanes will write to a same resultant register. The scatter write logic 728 then provides the micro-ops for these same lanes to the core logic 727 which generates the non masked-out resultant lanes for a same resultant register. These same register resultant lanes are then either combined into the contents of the target register (which has been read from register storage space) and then the entire resultant register contents with the new lane values are written back to vector register space, or, are individually written into their correct lanes within the target register within vector register space.

The pipeline discussed above or at least features of it is capable of use in graphics processor unit (or other processing unit such as a general purpose processing core). The graphics processing unit may be integrated onto a same die with other major system components such as those discussed below with respect to FIG. 8.

Figure 8:
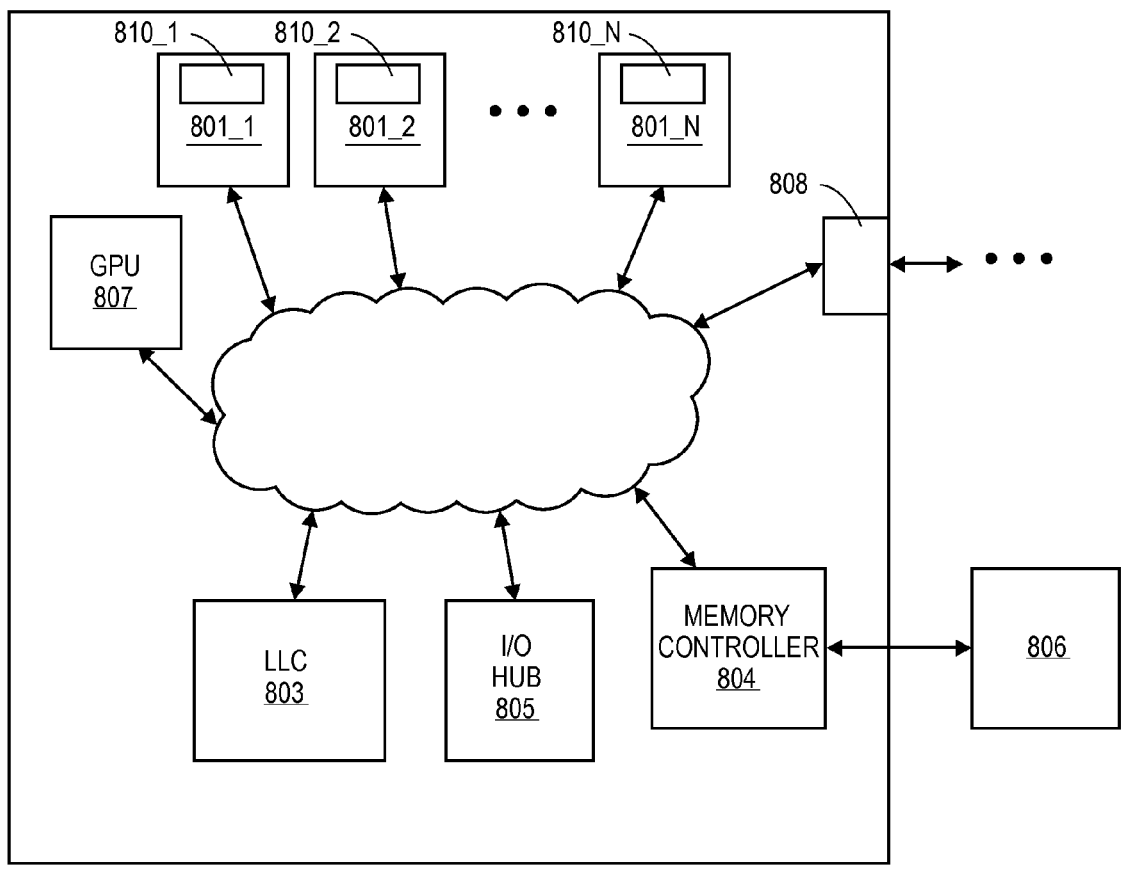
FIG. 8 shows a multi-core processor that includes prefetching technology.

FIG. 8 shows an exemplary multi-core processor 800 with may be implemented on a semiconductor chip with logic circuitry. As observed in FIG. 8, the processor includes: 1) multiple processing cores 801_1 to 801_N; 2) an interconnection network 802; 3) a last level caching system 803; 4) a memory controller 804 and an I/O hub 805. Each of the processing cores contain one or more instruction execution pipelines for executing program code instructions. The processing cores also typically posses at least one of their own respective caches (not shown). The interconnect network 802 serves to interconnect each of the cores 801_1 to 801_N to each other as well as the other components 803, 804, 805.

The last level caching system 803 serves as a last layer of cache in the processor 800 before instructions and/or data are evicted to system memory 806. The memory controller 804 reads/writes data and instructions from/to system memory 806. The I/O hub 805 manages communication between the processor and "I/O" devices (e.g., non volatile storage devices and/or network interfaces). Port 808 stems from the interconnection network 802 to link multiple processors so that systems having more than N cores can be realized. Graphics processor 807 performs graphics computations. Other functional blocks of significance (phase locked loop (PLL) circuitry) are not depicted in FIG. 8 for convenience.

Each of the processing cores 801_1 through 801_N is observed to include its own prefetcher circuit 810_1 through 810_N. Each prefetcher 810_1 through 810_N is coupled to its core's translation look-aside buffer (not shown) to receive page size information. The prefetcher circuits prefetch instructions and/or data for the streams of their respective cores. In a nominal implementation, the prefetchers 810_1 through 810_N issue prefetch requests to the last level cache 803 (at least if initial lookups in cache(s) local to their respective processors result in a miss). Misses in the last level cache 803 produce cause requests to be issued to system memory. If the processor 800 is just one processor in a multi-processor computer system, each processor is given may be given its own slice of system memory address space. As such, a request issued to system memory may traverse a network to be directed toward a processor that has been allocated the address of the request.

The cores 801_1 through 801_N may be homogenous or heterogeneous in terms of architecture instruction set; that is, two or more of the cores 801_1 through 801_N may be capable of execution the same instruction set, while others may be capable of executing only a subset of that instruction set or a different instruction set. In one embodiment, the cores 801_1 through 801_N are heterogeneous and include both the "small" cores and "big" cores described below.

Figure 9:
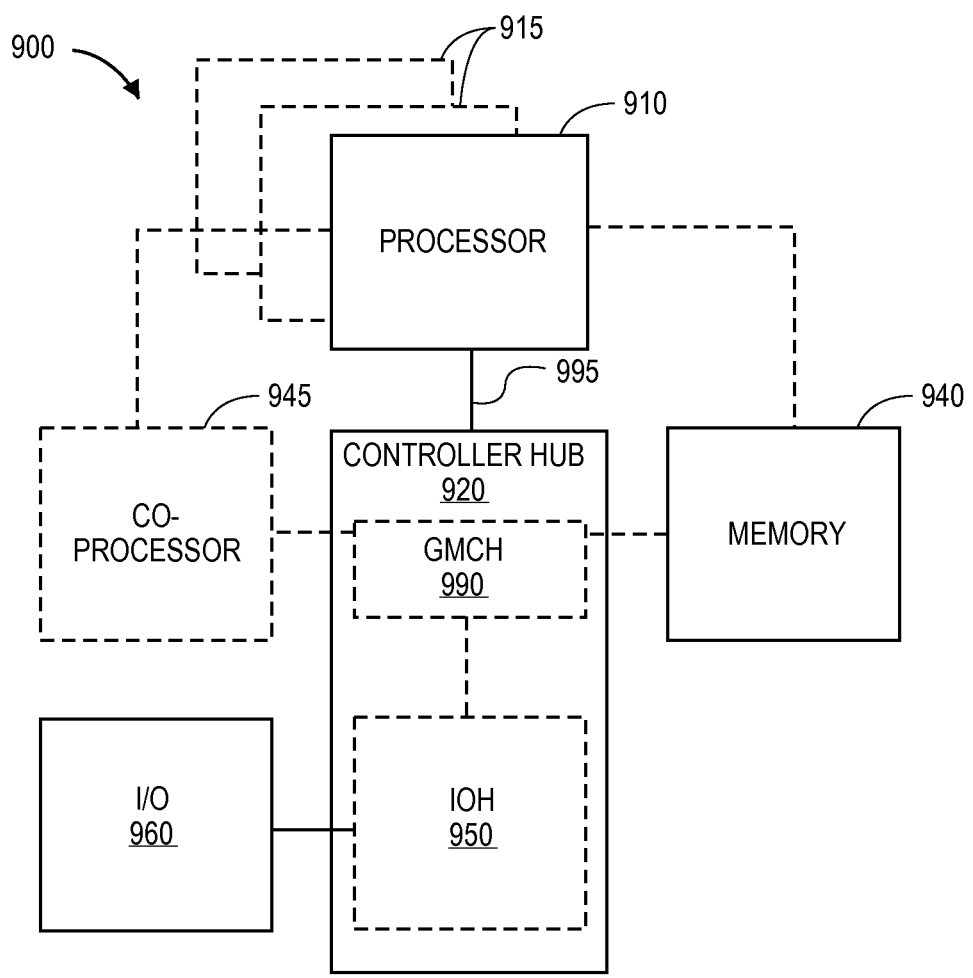
FIG. 9 illustrates a block diagram of a system in accordance with one embodiment of the present invention.
Figure 10:
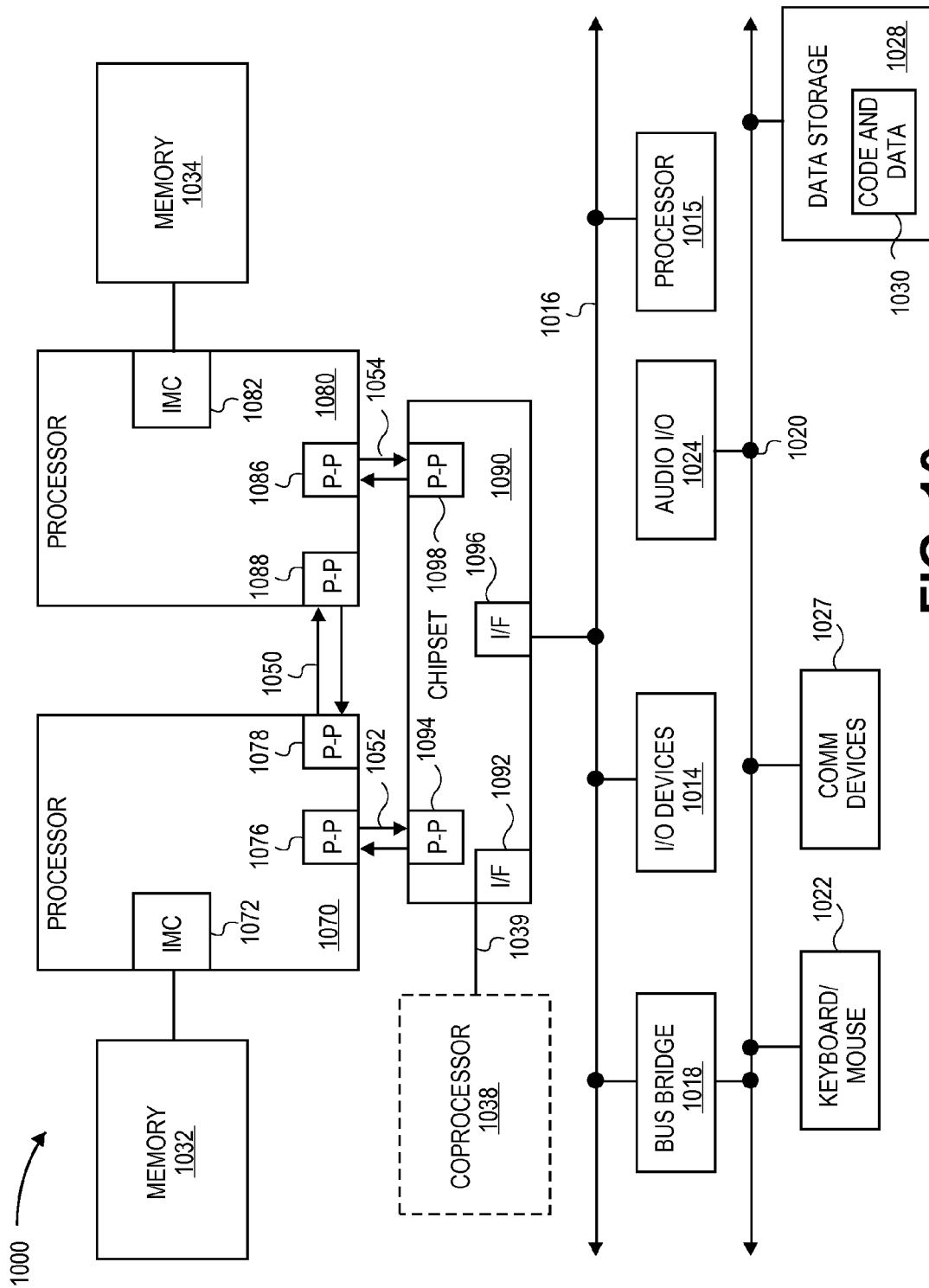
FIG. 10 illustrates a block diagram of a second system in accordance with an embodiment of the present invention.

FIGS. 9 and 10 show block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 9, shown is a block diagram of a system 900 in accordance with one embodiment of the present invention. The system 900 may include one or more processors 910, 915, which are coupled to a controller hub 920. In one embodiment the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 is couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of the processing cores described herein and may be some version of the processor 200.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface such as QuickPath Interconnect (QPI), or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

FIG. 10 shows a block diagram of a first more specific exemplary system 1000 in accordance with an embodiment of the present invention. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processor 200. In one embodiment of the invention, processors 1070 and 1080 are respectively processors 910 and 915, while coprocessor 1038 is coprocessor 945. In another embodiment, processors 1070 and 1080 are respectively processor 910 coprocessor 945.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, and 1098. Chipset 1090 may optionally exchange information with the coprocessor 1038 via a high-performance interface 1039. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

Figure 11:
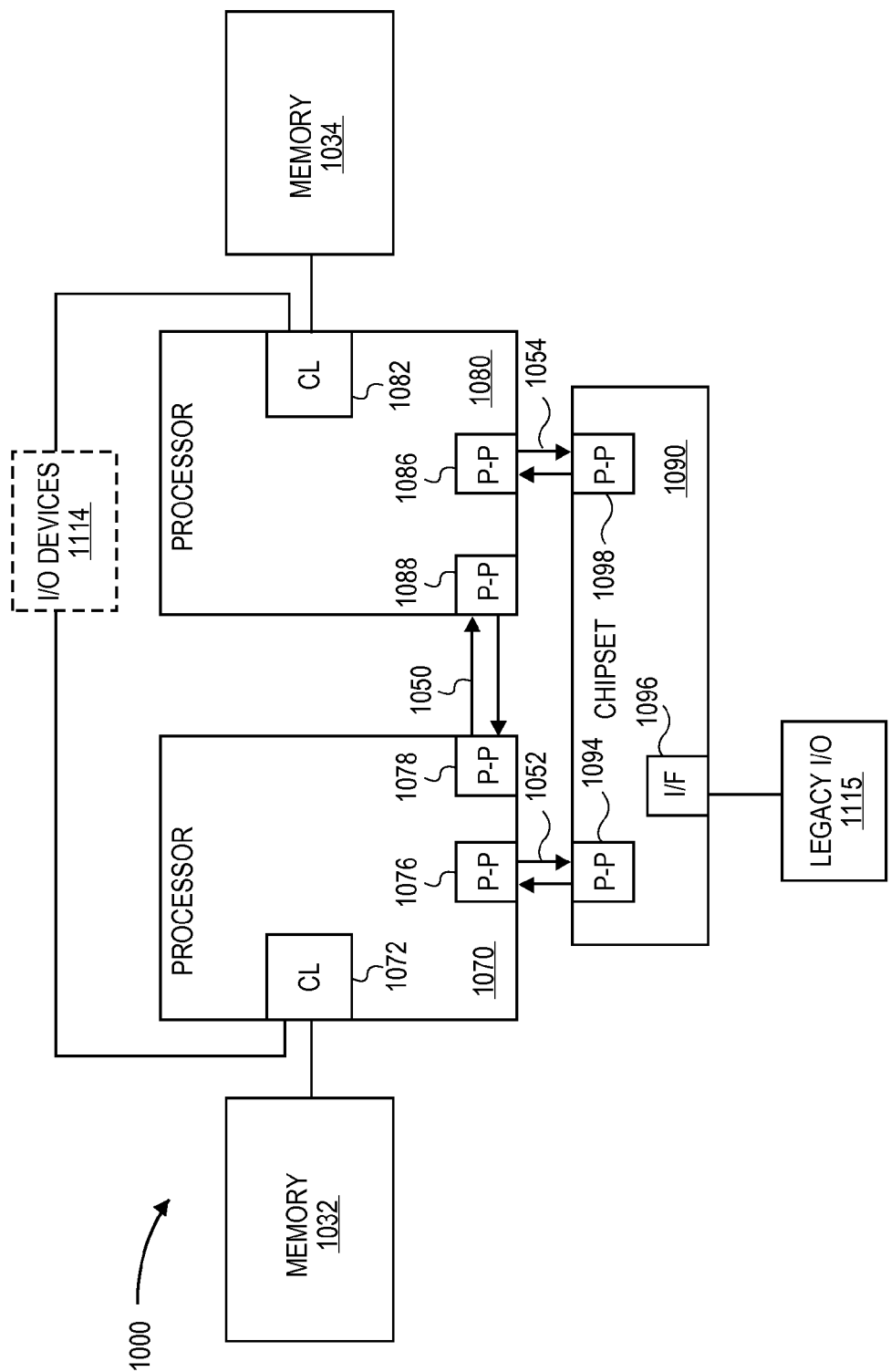
FIG. 11 illustrates a block diagram of a third system in accordance with an embodiment of the present invention.

FIG. 11 shows a block diagram of a second more specific exemplary system 1100 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1070, 1080 may include integrated memory and I/O control logic ("CL") 1072 and 1082, respectively. Thus, the CL 1072, 1082 include integrated memory controller units and include I/O control logic. FIG. 11 illustrates that not only are the memories 1032, 1034 coupled to the CL 1072, 1082, but also that I/O devices 1114 are also coupled to the control logic 1072, 1082. Legacy I/O devices 1115 are coupled to the chipset 1090.

Figure 12:
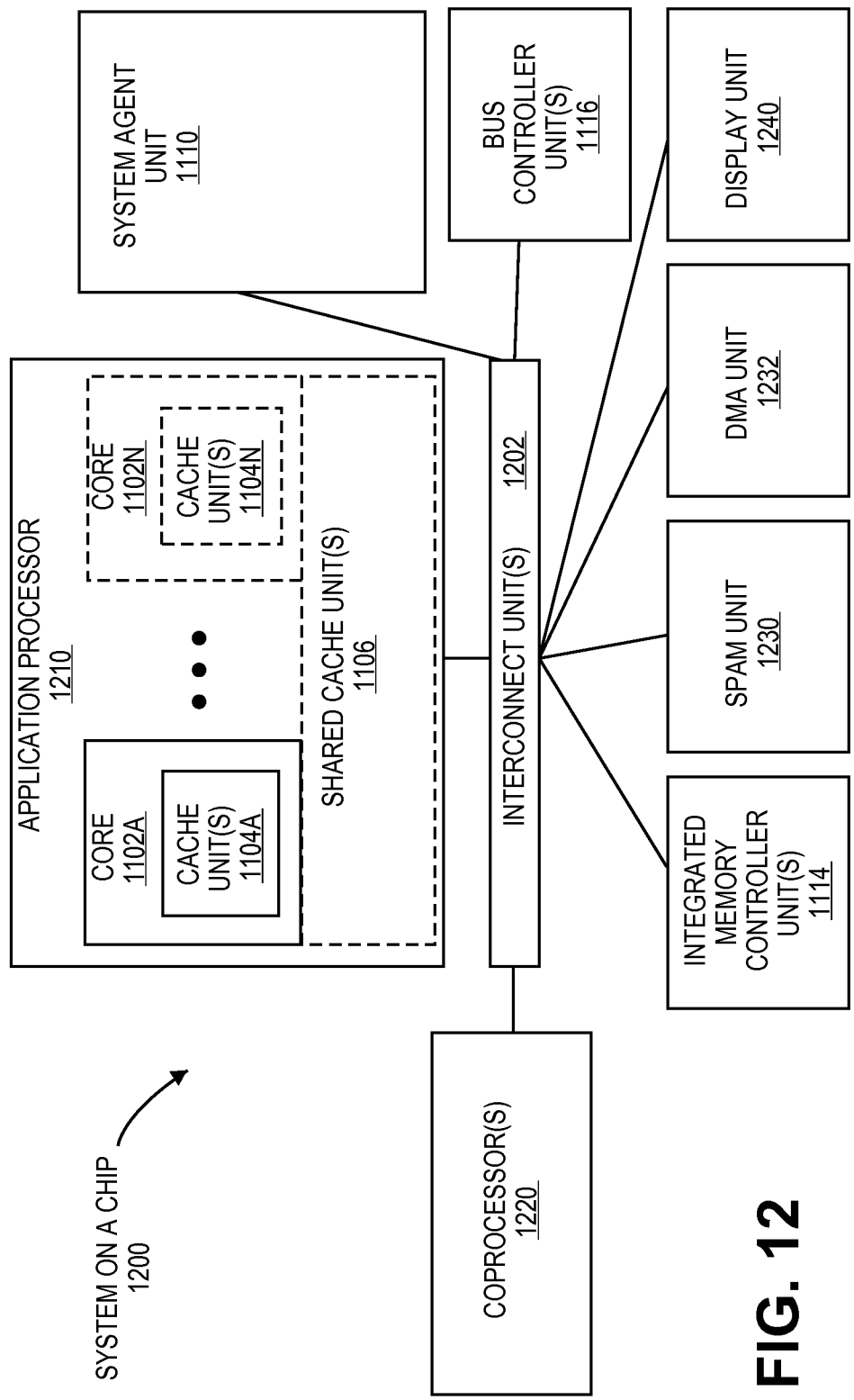
FIG. 12 illustrates a block diagram of a system on a chip (SoC) in accordance with an embodiment of the present invention.

Referring now to FIG. 12, shown is a block diagram of a SoC 1200 in accordance with an embodiment of the present invention. Dashed lined boxes are optional features on more advanced SoCs. In FIG. 12, an interconnect unit(s) 1202 is coupled to: an application processor 1210 which includes a set of one or more cores 1201_1 through 1201_N with respective internal cache units 1204_1 through 1204_N and shared cache unit(s) 1206; a system agent unit 1210; a bus controller unit(s) 1216; an integrated memory controller unit(s) 1214; a set or one or more coprocessors 1220 which may include integrated graphics logic, an image processor, an audio processor, and a video processor; an static random access memory (SRAM) unit 1230; a direct memory access (DMA) unit 1232; and a display unit 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 13 shows a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

From the foregoing a processor has been described. The processor includes an instruction execution pipeline that has an instruction fetch stage to fetch an instruction specifying multiple target resultant registers. The instruction execution pipeline has an instruction decode stage to decode the instruction. The instruction execution pipeline has a functional unit to prepare resultant content specific to each of the multiple target resultant registers. The instruction execution pipeline has a write-back stage to write back the resultant content specific to each of the multiple target resultant registers. A computing system having the processor and a memory coupled to the processor has also been described.

A machine readable medium containing program code that when processed by a computing system causes a method to be performed has also been described where the method comprises compiling a software program into program code by: recognizing an operation that specifies resultants targeted for multiple vectors; instantiating an instruction into the program code having an instruction format that specifies multiple target registers for the resultants.

The invention claimed is:
1. A processor comprising:
an instruction execution pipeline having:
an instruction fetch stage to fetch a single instruction comprising a first input operand specifying multiple target resultant registers and a separate, second input operand comprising a mask vector;
an instruction decode stage to decode said single instruction into a decoded single instruction;
data dependency logic circuitry to check each of the multiple target resultant registers for data dependencies for the single instruction;
a functional unit to execute the decoded single instruction when all of the multiple target resultant registers are cleared for data dependencies to prepare resultant content specific to each of said multiple target resultant registers, and provide said resultant content specific for each of said multiple target resultant registers based on the mask vector; and
a write-back stage to write back said resultant content specific to each of said multiple target resultant registers based on the mask vector.

2. The processor of claim 1 wherein said multiple target resultant registers are vector registers.

3. The processor of claim 1 wherein said data dependency logic circuitry is to confirm that none of the multiple target resultant registers are to be overwritten until all operations that use values in the multiple target resultant registers as input operands have at least fetched these values.

4. The processor of claim 1 wherein said multiple target resultant registers are each vector registers.

5. The processor of claim 1 wherein the mask vector includes an element for each lane in the multiple target resultant registers to be written to that indicates for each lane whether or not the resultant content is to be written.

6. The processor of claim 1 wherein said functional unit incorporates a portion of said resultant content targeted to a same one of said target resultant registers into said one target resultant register's content.

7. The processor of claim 1 wherein said functional unit is to prepare said resultant content by performing one of the following operations:
an add operation;
a multiply operation;
a move operation;
a compare operation;
an OR operation;
an exclusive OR operation;
a decrement operation;
an increment operation; or
a logical NOT operation.

8. A computing system comprising:
a processor, said processor having an instruction execution pipeline, said instruction execution pipeline having:
an instruction fetch stage to fetch a single instruction comprising a first input operand specifying multiple target resultant registers and a separate, second input operand comprising a mask vector,
an instruction decode stage to decode said single instruction into a decoded single instruction,
data dependency logic circuitry to check each of the multiple target resultant registers for data dependencies for the single instruction;
a functional unit to execute the decoded single instruction when all of the multiple target resultant registers are cleared for data dependencies to prepare resultant content specific to each of said multiple target resultant registers, and provide said resultant content specific for each of said multiple target resultant registers based on the mask vector, and
a write-back stage to write back said resultant content specific to each of said multiple target resultant registers based on the mask vector; and
a memory coupled to said processor.

9. The computing system of claim 8 wherein said multiple target resultant registers are vector registers.

10. The computing system of claim 8 wherein said data dependency logic circuitry is to confirm that none of the multiple target resultant registers are to be overwritten until all operations that use values in the multiple target resultant registers as input operands have at least fetched these values.

11. The computing system of claim 8 wherein said multiple target resultant registers are each vector registers.

12. The computing system of claim 8 wherein the mask vector includes an element for each lane in the multiple target resultant registers to be written to that indicates for each lane whether or not the resultant content is to be written.

13. The computing system of claim 8 wherein said functional unit incorporates a portion of said resultant content targeted to a same one of said target resultant registers into said one target resultant register's content.

14. The computing system of claim 8 wherein said functional unit is to prepare said resultant content by performing one of the following operations:
an add operation;
a multiply operation;
a move operation;
a compare operation;
an OR operation;
an exclusive OR operation;
a decrement operation;
an increment operation; or
a logical NOT operation.

15. A non-transitory machine readable medium containing program code that when processed by a computing system causes a method to be performed, said method comprising:
fetching a single instruction comprising a first input operand specifying multiple target resultant registers and a separate, second input operand comprising a mask vector;
decoding said single instruction into a decoded single instruction;
checking each of the multiple target resultant registers for data dependencies for the single instruction;
executing the decoded single instruction with a functional unit when all of the multiple target resultant registers are cleared for data dependencies to prepare resultant content specific to each of said multiple target resultant registers, and provide said resultant content specific for each of said multiple target resultant registers based on the mask vector; and
writing back said resultant content specific to each of said multiple target resultant registers based on the mask vector.

16. The non-transitory machine readable medium of claim 15 wherein said functional unit is to prepare said resultant content by performing one of the following operations:
an add operation;
a multiply operation;
a move operation;
a compare operation;
an OR operation;
an exclusive OR operation;
a decrement operation;
an increment operation; or
a logical NOT operation.

17. The non-transitory machine readable medium of claim 15 wherein said checking comprises confirming that none of the multiple target resultant registers are to be overwritten until all operations that use values in the multiple target resultant registers as input operands have at least fetched these values.

18. The non-transitory machine readable medium of claim 15 wherein said multiple target resultant registers are each vector registers.

19. The non-transitory machine readable medium of claim 15 wherein the mask vector includes an element for each lane in the multiple target resultant registers to be written to that indicates for each lane whether or not the resultant content is to be written.

20. The non-transitory machine readable medium of claim 15 wherein said multiple target resultant registers are vector registers.

\* \* \* \* \*